April 2, 1935. C. C. CORKRAN 1,996,063

APPARATUS FOR TESTING JOURNAL BEARING LUBRICATION

Filed Jan. 23, 1932

Inventor
Ceylon C. Corkran
per: J. N. Adams
Attorney

Patented Apr. 2, 1935

1,996,063

UNITED STATES PATENT OFFICE 1,996,063

APPARATUS FOR TESTING JOURNAL BEARING LUBRICATION

Ceylon C. Corkran, San Francisco, Calif., assignor to Standard Oil Company of California, San Francisco, Calif., a corporation of Delaware Application January 23, 1932, Serial No. 588,340

2 Claims. (Cl. 175—183)

This invention relates to apparatus for measuring the lubrication conditions of a shaft rotating in a bearing, for determining the degree of metal-to-metal contact between the shaft and the bearing, as affected by said lubrication conditions, and particularly for indicating the relative thickness of the lubricating film between the moving and stationary parts.

Heretofore, use has been made of the electrical resistance of the film of oil in a bearing to show in a general way when such a film had been established. This was accomplished by connecting the bearing and shaft in an electrical circuit containing a source of current and an electric lamp. When the bearing was stationary, a low resistance metal-to-metal contact was established between the shaft and the bearing by the squeezing out of the oil film under the weight of the shaft. This allowed a current to flow and the lamp to light. When the shaft was rotated, the well-known wedging action of the oil tended to lift the shaft from its metal-to-metal contact and interposed a partially insulating film between the parts, causing the lamp to go out.

While the interruption of current was seemingly instantaneous and complete, careful experiment has shown that the electrical resistance interposed by the presence of the oil film, although sufficient to cause the lamp to apparently become extinguished, is of varying intensity and can be determined by suitable measuring equipment and methods of manipulation which will be described in the following paragraphs.

By careful and repeated measurement, using oils of various viscosities, it has been discovered that variations in contact resistance occur, which variations may be used to determine the relative film thickness of each oil so that an optimum condition for the lubrication of a given bearing can be accurately determined. It is particularly pointed out, however, that the electrical resistance of the oil film itself is not measured, but the changing resistance between the two metallic surfaces which are partially but not completely separated by that film.

It is well known that all bearings, no matter how well they are lubricated, wear to some extent during a long period of operation. This alone definitely establishes the fact that some points of the moving and stationary surfaces are perodically in metallic contact. It is the determination of the degree of this contact, which has been found to be a measure of the oil film thickness, or rather the distance of separation of the two surfaces, which is the subject of this invention.

As stated above, when the bearing has been stationary for a period of time the oil film is squeezed out from between the loaded contact surfaces. This allows practically all of the microscopic roughnesses of both adjacent surfaces to touch over an appreciable area. As the wedging action of the oil begins, due to rotation of the shaft, the surfaces are forced apart so that only their more extreme roughnesses or projecting points periodically contact during each revolution. Should the film thickness be increased due to the use of a more viscous oil or a higher rate of oil feed, for the same R. P. M. of the shaft, the surfaces will be spread farther and farther apart; the number and area of these microscopic contacting points will be decreased, causing the electrical resistance of the bearing to be increased.

The objection of correct lubrication is to supply an oil in such quantity and character that these contacts are reduced to a minimum, consistent with the power lost and heat developed in the bearing. For example, an extremely heavy viscous oil might afford the maximum separation of the moving surfaces, but the power required to turn the shaft would be so great that its conversion to heat, and consequent rise in temperature of the bearing, would be excessive. Accordingly, for a certain difference in temperature between the bearing shell and the atmosphere, a given bearing load and speed, a certain viscosity and quantity of oil will give an optimum and usually ample film thickness, which may be determined by the method and apparatus herein disclosed.

It is, therefore, an object of this invention to provide apparatus for determining the relative thickness of a lubricant film in a bearing.

A further object is to provide apparatus for determining the relative thickness of a lubricant film in a bearing by measuring the electrical resistance between the moving and stationary parts thereof.

Another object of the invention is to disclose apparatus for determining the optimum thickness of a film of lubricant in a bearing.

A still further object of the invention is to disclose apparatus for determining the relative thickness of a lubricant film of a bearing while it is in place and in service by measuring the electrical resistance between the moving and stationary parts thereof.

Another object of the invention is to determine the degree of metallic contact between the moving and stationary parts of a lubricated bearing by measuring the electrical resistance of said contact.

Yet another object is to determine the effect of various oils on the degree of metallic contact between the moving and stationary parts of a bearing by measuring the electrical resistance of said contact in order to determine the characteristics and quantity of the oil which will afford maximum efficient lubrication.

These and other objects and advantages of this invention will become apparent to those skilled in the art from the following detailed description of one preferred embodiment of this invention and its manner of operation, it being understood that the invention is not limited to the device specifically described hereinafter.

In describing the invention reference will be made to the accompanying drawing which forms a part of this specification, and in which Fig. 1 is a diagram of connections showing one mode of operation of the invention.

Figure 1:
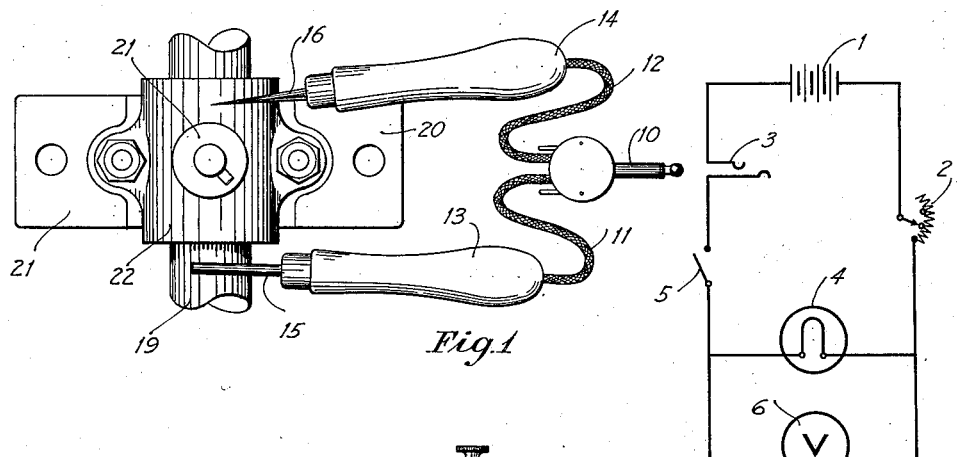
Figure 2:
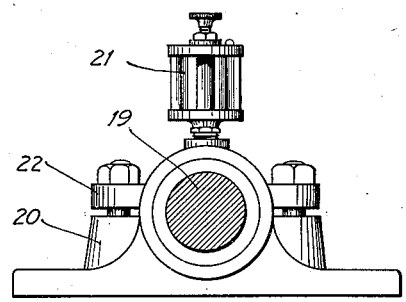
Fig. 2 is an elevation of a conventional shaft and journal bearing as shown in plan in Fig. 1.

In the arrangement shown in the drawing, 1 represents a three-volt battery of dry cells, or preferably a constant-voltage battery such as a portable lead-acid or nickel-iron storage battery, connected in series with a fifteen ohm calibrated rheostat 2, a two-contact jack 3, a three volt miniature electric lamp 4, and a small tumbler switch 5. A direct current voltmeter 6 with a full scale deflection of 0 to 4 volts is connected in parallel with the lamp 4 and indicates the potential across its filament when the circuit is completed.

The rheostat 2 is provided with a dial 7, which may be calibrated in any convenient units. Surrounding the shaft of the rheostat 2 is a movably mounted pointer or index 8 which may be rotated to any point on the periphery of the dial 7, to serve as a reference marker. This remains in position independently of rotation of the shaft during subsequent manipulation.

A fiber tube 9 is fastened to the base of the lamp and extends for a short distance above the lamp to form a shield so that the brightness of the filament may be observed fairly accurately under varying external light conditions.

The portable contact-making apparatus consists of a conventional plug 10 adapted to be received in the jack 3. Plug 10 is provided with two flexible insulated copper wires 11 and 12, which latter terminate in two fiber or wood insulating handles 13 and 14, respectively. Secured in handle 13 and connected to the wire 11 is a soft bare copper rod 15, approximately ¼ inch in diameter and 6 inches long. Secured in handle 14 and connected to wire 12 is a hardened steel rod 16, approximately ¼ inch in diameter and 6 inches long, with its outer end tapered to a sharp point.

Figure 3:
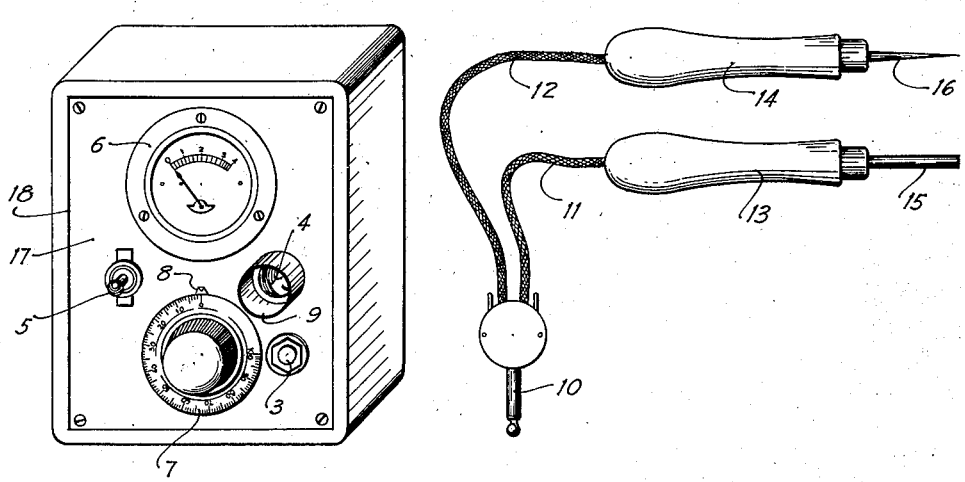
Fig. 3 is a perspective view of an assembled device showing its arrangement in a carrying case with the extension leads for contacting the bearing and shaft.

This equipment is assembled as shown in Fig. 3 with the jack 3, lamp 4, switch 5, voltmeter 6, dial 7, index 8, and fiber sleeve 9 mounted on an insulated panel 17 set into the top of a convenient wooden carrying case 18. Battery 1 and the necessary connecting wires (not shown) are contained within the box. The extension wire assembly is detachable by removing plug 10 from jack 3 and is usually carried in the cover (not shown) of the case 18.

In operation we will assume a shaft 19 rotating in a journal bearing 20 and supplied with oil from an adjustable sight feed lubricator 21, which is mounted on the bearing cap 22. The plug 10 is inserted in jack 3 and the switch 5 is closed. The copper rod 15 is placed in contact with the steel rod 16, thus completing the circuit through the battery 1, rheostat 2 and lamp 4. The dial 7 of the rheostat 2 is moved to increase the resistance of the rheostat until the lamp 4, within its shield 9, appears to go out or at least until its filament no longer glows. At this point the voltmeter will read approximately zero, showing that there is little potential drop across the lamp, and practically no current flow through the circuit.

The movable index 8 is turned around the shaft of the rheostat until it coincides with that mark or division on the dial 7 which indicates maximum resistance of the rheostat.

The copper rod 15 and steel rod 16 are separated, and are placed in firm contact with the rotating shaft 19 and the bearing cap 22, respectively. Care must be taken that the copper rod makes a good contact with the rotating shaft and that the point of the steel rod passes completely through any grease or paint on the cap of the bearing and makes a good electrical contact therewith. In the case of self-aligning bearings, it may be advisable to press the point of the steel rod 16 into the inner sleeve or bearing, preferably into the Babbitt or soft metal lining thereof.

The dial 7 of the rheostat 2 is turned until all of the resistance of the rheostat is cut out. This will cause the lamp to burn brightly and will give an indication of approximately 2–3 volts on the voltmeter 6. The dial 7 is slowly turned in the opposite direction, to increase the resistance, until the shielded lamp again appears to go out, and the voltmeter shows a practically zero reading as before. That scale division on the dial 7, which is now opposite the movable pointer 8 is noted and recorded.

It will be found that rotating bearings which are scored, over-loaded, or supplied with insufficient oil or oil of too light a body, will give practically the same dial reading as was obtained by short circuiting the steel and copper rods. In other words, metal-to-metal contact is present. On the other hand, if the bearing is in good condition and is properly loaded and lubricated so that the temperature rise is not over about 40° F., as determined by any form of thermometer or temperature indicator in contact with the bearing cap 22, only a portion of the rheostat resistance will have to be cut into the circuit to cause the lamp to go out. In other words, there will be an appreciable electrical resistance between the two relatively moving surfaces of the bearing and the shaft. Therefore, only a portion of the resistance of the rheostat will be required to bring the total circuit resistance to the value previously obtained when the extension leads were short circuited. The difference between the two rheostat dial readings; one with the rods short circuited and the lamp out, and the other with the bearing contact in the circuit, and the lamp out; will be a measure or indication of the separation of the bearing-surfaces and therefore the oil film thickness. The greater the difference in these readings the thicker the film, and vice versa.

It will sometimes be found that very accurately made and unusually well lubricated bearings, such as the sleeve bearings of electrical motors in perfect condition, will cause a completely open circuit when they are rotating, so that the lamp will not light even though all of the resistance of the rheostat is cut out. This means that a practically theoretically perfect bearing is being tested, in which there is so little metal-to-metal contact that the low voltage of the battery will not force enough current through the bearing to light the lamp. This condition is seldom realized, however, in ordinary line-shafting and the general run of machine bearings.

In order to determine the comparative lubricating values of different oils, they may be successively tried in the sight feed lubricator 21 under the same conditions of bearing load, temperature rise, and speed, and the oil which gives the greatest difference in readings as outlined above will give the most efficient and economical lubrication.

Essentially, the apparatus outlined is a current measuring device, the lamp acting as a shunt for the voltmeter, which thereby functions as an ammeter. An ammeter, or other unitary current measuring device could equally well be substituted for these two. As the null method of comparison is used, the current being reduced to approximately zero in each measurement, no particular calibration of the current indicator is required. If desired, the resistance of the bearing contact could be measured directly as by a Wheatstone bridge. Any other resistance measuring or comparing device or method could equally well be used, such as an ohm-meter or other well-known apparatus. I prefer the device described, however, because of its simplicity, cheapness, visible indication in two ways (the voltmeter and the lamp) and easy replacement of parts which may become damaged. It is also quite convenient for visually demonstrating to non-technical observers the effect of various grades and viscosities of oils upon the film thickness and temperature rise in a bearing, as well as showing the mechanical conditions of the bearing, without removing the latter from service.

The essence of this invention is, therefore, the determination of the condition of the lubricating film in a bearing, particularly its thickness, by measuring the electrical resistance between the relatively moving parts of the bearing. This is accomplished, not by measuring the electrical resistivity of the oil itself, but by measuring the contact resistance between the two parts, which resistance is altered by the thickness of the oil film.

It will be apparent to those skilled in the art that numerous changes and modifications could be made in the apparatus or technique disclosed above and all such changes and modifications as come within the scope of the appended claims are embraced thereby.

I claim:

1. An apparatus for determining the degree of metallic contact between stationary and movable parts of a lubricated bearing which comprises contact points for said stationary and movable parts, an electrical circuit connecting said points, a source of electrical current in said circuit, a variable resistor in said circuit, a voltmeter in said circuit and a lamp in parallel with said voltmeter.

2. An apparatus for determining the degree of metallic contact between stationary and movable parts of a lubricated bearing which comprises a pointed contact for said stationary part, a soft metal contact for said movable part, an electrical circuit connecting said contacts, a battery in said circuit, a rheostat to control the current from said battery, a voltmeter in said circuit and a lamp in parallel with said voltmeter.

CEYLON C. CORKRAN.